(12) United States Patent
Bibelhausen et al.

(10) Patent No.: US 9,934,111 B2
(45) Date of Patent: Apr. 3, 2018

(54) CONTROL AND DATA TRANSMISSION SYSTEM, PROCESS DEVICE, AND METHOD FOR REDUNDANT PROCESS CONTROL WITH DECENTRALIZED REDUNDANCY

(71) Applicant: PHOENIX CONTACT GMBH & CO. KG, Blomberg (DE)

(72) Inventors: Volker Bibelhausen, Detmold (DE); Andre Brand, Blomberg (DE); Henning Heutger, Bad Pyrmont (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 134 days.

(21) Appl. No.: 14/782,114

(22) PCT Filed: Apr. 2, 2014

(86) PCT No.: PCT/EP2014/056629
§ 371 (c)(1),
(2) Date: Oct. 2, 2015

(87) PCT Pub. No.: WO2014/161909
PCT Pub. Date: Oct. 9, 2014

(65) Prior Publication Data
US 2016/0048434 A1    Feb. 18, 2016

(30) Foreign Application Priority Data
Apr. 4, 2013   (DE) .................. 10 2013 103 380

(51) Int. Cl.
*G06F 11/20*   (2006.01)
*G05B 19/042*  (2006.01)

(52) U.S. Cl.
CPC ...... *G06F 11/2033* (2013.01); *G05B 19/0428* (2013.01)

(58) Field of Classification Search
CPC ............. G06F 11/2005; G06F 11/2017; G06F 11/202; G06F 11/2033; G06F 11/2041
See application file for complete search history.

(56) References Cited

U.S. PATENT DOCUMENTS 6,732,289 B1 *  5/2004  Talagala .............. G06F 11/2092
                                              714/6.3
6,732,300 B1 *  5/2004  Freydel ................. G06F 11/184
                                              714/10

(Continued)

FOREIGN PATENT DOCUMENTS

CN   201013350 Y   1/2008
CN   101383509 A   3/2009

(Continued)

OTHER PUBLICATIONS

International Preliminary Report on Patentability dated Oct. 15, 2015 for International application No. PCT/EP2014/056629 (8 pgs.).

(Continued)

*Primary Examiner* — Joseph R Kudirka
(74) *Attorney, Agent, or Firm* — Maldjian Law Group LLC

(57) ABSTRACT

There is provided a control and data transmission system, comprising at least one control device which, in normal operation, is connected by means of a communication network to at least one process device designed as an input and/or output device, wherein the process device comprises an evaluation unit designed to detect a failure in the control system, an emergency control program which can be parameterized and which is stored in a memory of the process device, and a runtime system designed to execute the emergency control program, and wherein the process device is designed to switch to emergency operation in response to a failure in the control system detected by the evaluation (Continued)

unit, in which emergency operation the process device executes the emergency control program. The invention further provides a process device for use in such a control and data transmission system and a method for redundant process control.

16 Claims, 2 Drawing Sheets

(56) References Cited

U.S. PATENT DOCUMENTS

| | | | |
|---|---|---|---|
| 9,104,643 B2* | 8/2015 | DeCusatis | G06F 11/2005 |
| 2005/0080887 A1* | 4/2005 | Lee | G06F 11/2025 709/223 |
| 2008/0162984 A1* | 7/2008 | Kalra | H04L 41/0213 714/4.11 |
| 2015/0269038 A1* | 9/2015 | Perez | G06F 11/2028 714/5.1 |

FOREIGN PATENT DOCUMENTS

| | | |
|---|---|---|
| CN | 101592948 A | 12/2009 |
| DE | 199 29 804 A1 | 1/2000 |
| DE | 100 30 329 C1 | 1/2002 |
| DE | 10 2006 047 026 B4 | 4/2008 |
| EP | 1297394 B1 | 3/2004 |

OTHER PUBLICATIONS

Chinese Office Action received for corresponding Chinese Patent Application No. 201480019616.1 dated Dec. 2, 2016, 28 Pages.
International Search Report issued in connection with corresponding International Application No. PCT/EP2014/056629 dated Jul. 24, 2014 (12 pages total).
Chinese Office Action dated Jul. 14, 2017 issued in connection with corresponding Chinese Patent Application No. 201480019616.1 (22 pages total).

* cited by examiner

CONTROL AND DATA TRANSMISSION SYSTEM, PROCESS DEVICE, AND METHOD FOR REDUNDANT PROCESS CONTROL WITH DECENTRALIZED REDUNDANCY

FIELD

The invention generally relates to automation technology and more particularly to a control and data transmission system including at least one control device which is connected via a communication network to at least one process device configured as an input and/or output device, and also relates to a method for redundant process control.

BACKGROUND

In automation technology, so-called redundancy controllers are used for applications that are designed for high availability, such as tunnel surveillance. A control device which is usually referred to as a controller controls the process, and the other control device runs in standby mode in order to be able to take over process control when certain events occur. The program sequence is synchronized between the control devices via a synchronization connection, so that after a switching event the process can continue to be controlled in the same way. Besides this synchronization of the application program, further information is also exchanged between the control devices to ensure consistent operation. Each of the control devices must be informed about the status and operation of the other control device in order to synchronize its own sequence.

In general, an appropriate redundancy control system comprises two control devices which are synchronized with each other, and lower level input/output stations which are connected to both control devices via an appropriate communication network.

For example, a redundant control system including control computers and a peripheral unit is known from DE 100 30 329 C1, in which the control computers are outputting heartbeats which change cyclically, and in the absence of a heartbeat change, the peripheral unit switches to the respective other control computer.

Furthermore, DE 10 2006 047 026 B4 describes a control and data transmission system having at least two control devices and at least one slave device, which are interconnected via a communication network, wherein the slave device has a plurality of addressable output interfaces for receiving output and status data, and each control device comprises a device for generating and transmitting status and output data to a separate output interface of the slave device, and wherein the slave device comprises an evaluation device which, in response to the status signals received from the control devices, controls the forwarding of received output data for further use.

If a failure occurs in a redundantly configured control system, i.e. a failure in both redundant control devices, the lower level process can no longer be served because there will not be any controller left that could process the input and output data. The same applies to a failure in the communication network.

SUMMARY

The invention is based on the object to find a way to simplify and/or improve a method and a control and data transmission system for redundant process control, and in particular how drawbacks of the solutions known from prior art can be avoided or reduced.

A key concept of the invention is to have a process device which is configured as an input and/or output device which during normal operation is controlled by at least one control device, equipped with its own intelligence, in order to be able to sustain an emergency operation of the process device in case that controlling by the control device is no longer guaranteed, and for this purpose the process device is provided with a runtime system to execute a sequence program for emergency control stored in the process device.

The technical problem mentioned above is firstly solved by the features of claim 1.

Accordingly, a control and data transmission system for redundant process control is provided, which comprises at least one control device and at least one process device configured as an input and/or output device, which in normal operation are interconnected via a communication network. It should be noted at this point that the control and data transmission system may be an automation system and the process device may be a field device. Furthermore, the control device may for example be a programmable logic controller (PLC).

The process device comprises an evaluation unit adapted to detect a control failure, an emergency control program which is parameterizable and which is stored in a memory of the process device, and a runtime system adapted to execute the emergency control program, wherein the process device is adapted to switch to emergency operation in response to a control failure detected by the evaluation unit, in which emergency operation the process device executes the emergency control program.

In a particularly preferred embodiment, the control and data transmission system comprises at least a first control device and a second control device redundant to the first control device, wherein both control devices are connected to the process device during normal operation, and wherein the process device switches to emergency operation only if the evaluation unit detects a control failure for both control devices.

Preferably, a control failure is detected by the evaluation unit for a control device if no signal has been received from the control device for a predetermined period of time, wherein in this case both a failure of the communication link between control device and process device and a failure of the control device are detected. However, it is also possible that a failure occurs in which the control device has a malfunction, but continues to send erroneous data telegrams. For identifying such a failure, the evaluation unit may advantageously detect a control failure when an erroneous signal has been received from the control device. For example, for detecting an erroneous signal, data telegrams transmitted from the control device to the process device may be provided with a check sum and/or a sequential identifier, which are checked by the evaluation unit. Furthermore, in case that a control device itself detects its own malfunction, the evaluation unit may detect a control failure when a status signal has been received from the control device which indicates a failure of the control device.

It should be noted that the evaluation unit is preferably adapted to forward output data received during normal operation to a physical interface of the process device, and/or to forward input data read via a physical interface to one or more redundant higher level control devices.

In the simplest case, the emergency control program is used to bring the process device or the sub-process controlled by the process device into a defined safe state in order to avoid critical system states or other dangerous situations.

However, particularly advantageously the emergency control program executed by the process device serves to continue process control, wherein the logic of the emergency control program need not be the same as the logic of the higher level system, i.e. the logic of the control program executed by the control devices. This means that during emergency operation a different functionality may be provided than during normal operation. Furthermore, the emergency control program may have a reduced functionality compared to a control program executed by the control devices.

Depending on the configuration of the runtime system of the process device, the sequence program provided as an emergency control program may be written, for example, in IEC 61131 syntax or in a high-level programming language.

For the purpose of continued process control, the process device is particularly advantageously adapted to exchange data with at least one further process device via the communication network during emergency operation, wherein in particular data received by the process device from the further process device are supplied to the emergency control program as input data, and/or wherein output data generated by the emergency control program are transmitted from the process device to the further process device.

Since a direct data exchange between different process devices is only necessary during emergency operation in case of failure of the higher level controller, the process device is preferably adapted to establish the communication link to the at least one further process device only during emergency operation.

Particularly advantageously, the data exchange between different process devices permits a synchronized emergency operation over an entire automation system or over part of an automation system. Advantageously, the emergency control program executed by the process device may be further adapted to bring at least one further process device into a safe operating state.

Advantageously, the process device is adapted to automatically switch from the emergency operation back to the normal operation as soon as the evaluation unit detects a functional control device. This may for instance be the case as soon as an error-free data message from a control device is received again. When switching from the emergency operation to the normal operation, the execution of the emergency control program is terminated.

In a preferred embodiment, the control and data transmission system further comprises an operating and/or monitoring device connected to the communication network, which is adapted to communicate with the at least one control device during normal operation and with the process device during emergency operation. Preferably, the operating and/or monitoring device is configured as an OPC server (OPC: OLE (Object Linking and Embedding) for Process Control) with an OPC client connected thereto.

The embodiments of a control and data transmission system described above may advantageously be combined in any suitable way.

The technical problem mentioned above is further solved by the features of claim 10.

Accordingly, a process device configured as an input and/or output device, in particular as a field device, is provided, which is connectable to at least one control device via a communication network and which is adapted to be controlled by the control device during normal operation, which process device comprises an evaluation unit adapted to detect a control failure, an emergency control program which is parameterizable and which is stored in a memory of the process device, and a runtime system adapted to execute the emergency control program, wherein the process device is adapted to switch to emergency operation in response to a control failure detected by the evaluation unit, in which emergency operation the process device executes the emergency control program.

Furthermore, all embodiments of such a process device described above in conjunction with the control and data transmission system are also within the scope of the invention.

The technical problem mentioned above is further solved by the features of claim 11.

Accordingly, a method for redundant process control is provided, in which, during normal operation, at least one process device configured as an input and/or output device is controlled by at least one control device connected to the process device via a communication network, a control failure is detected by an evaluation unit of the process device, and the process device changes to emergency operation in response to a control failure detected by the evaluation unit, in which emergency operation the process device executes an emergency control program which is parameterizable and which is stored in a memory of the process device, using a runtime system.

Preferably, the method includes all the necessary method steps for operating the embodiments of a control and data transmission system described above, or of combinations thereof.

BRIEF DESCRIPTION OF THE DRAWINGS

The invention will now be described in more detail by way of preferred exemplary embodiments and with reference to the accompanying drawings. The same reference numerals in the drawings designate the same or similar parts. In the drawing.

DETAILED DESCRIPTION

Figure 1:
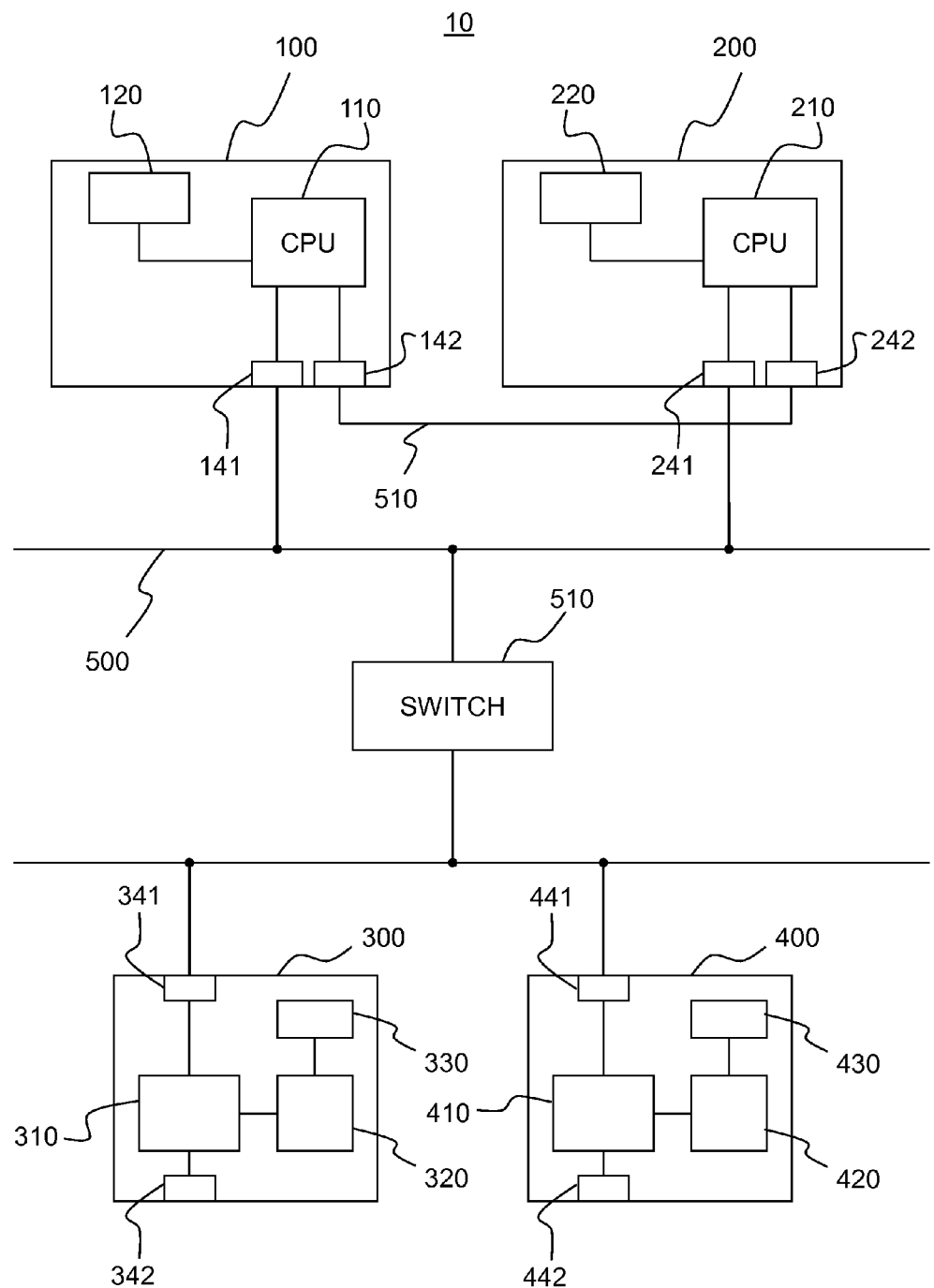
FIG. 1 is a schematic diagram of a preferred embodiment of a control and data transmission system.

FIG. 1 illustrates an exemplary control and data transmission system 10 which is used for example in automation technology or tunnel surveillance. In the illustrated exemplary embodiment, control and data transmission system 10 comprises two redundant control devices 100 and 200 which are connected to process devices 300 and 400 via a communication network 500. Communication network 500 may comprise further components, such as switch 510, as illustrated, and is configured as a PROFINET communication network in the illustrated exemplary embodiment. PROFINET (Process Field Network) is an open Industrial Ethernet standard used in the field of automation. However, any other suitable communication network may be used as well, such as a field bus.

Control devices 100 and 200 each comprise a memory, 120 and 220, respectively, in each of which a control program is stored which is executable by a respective processor, 110 and 210, respectively. Control devices 100 and 200 are each connected to PROFINET network 500 via an Ethernet interface, 141 and 241, respectively. Furthermore, control devices 100 and 200 are connected to each other via a direct connection 510 using additional interfaces 142 and 242. For example, direct connection 510 may be configured as an Ethernet based fiber optic (FO) connection, and interfaces 142 and 242 as FO interfaces, accordingly. However, any other suitable type of a direct connection is also within the scope of the invention. Connection 510 is used to synchronize the control programs executed by control devices 100 and 200, respectively, in a manner known per se. Furthermore, status data may be exchanged via connection 510, so that each of the control devices is informed about the operating state of the respective other control device and can detect a failure of the respective other control device.

Process devices 300 and 400, also referred to as field devices below, are configured as input/output stations, and a connection to the process to be controlled is effected via interfaces 342 and 442, which interfaces 342 and 442 have in particular sensors and/or actuators connected thereto. By way of example, it shall be assumed below that a sensor is connected to interface 342 of field device 300 and an actuator is connected to interface 442 of field device 400. Process devices 300 and 400 are each connected to communication network 500 via interfaces 341 and 441, respectively, and are thereby connected to control devices 100 and 200.

The process is controlled by one of control devices 100 or 200 as an active control device in each case, and if necessary control may be switched to the other control device. Provision may be made so that only the respective active control device transmits output data to the respective field devices. Alternatively, provision may be made so that both control devices transmit output data in parallel and based on status data transmitted additionally the field devices decide which output data are to be forwarded. In this case, interfaces 341 and 441 each comprise a separate logical interface for each of control devices 100 and 200.

During normal operation, the output data received by process device 400 are directly forwarded to the actuator connected to interface 442, and the input data read by the sensor connected to interface 342 are transmitted from process device 300 to higher level control devices 100 and 200.

It should be noted at this point that it is also possible that more than two control devices are able to exchange data with field devices 300 and 400. However, it is also possible that redundancy of the control devices is dispensed with and only one control device is provided. Furthermore, it should be noted that control and data transmission system 10 will generally include more than just the two illustrated process devices 300 and 400, and further, that one process device may have a plurality of sensors and/or actuators connected thereto.

If there is an interruption in communication between the higher level control devices and one of process devices 300 or 400, this failure will be detected by evaluation unit 310 or 410 of the respective process device, for example by detecting that a pre-configured monitoring time has been expired.

A failure may furthermore be detected if an erroneous signal has been received from a control device, or if a status signal has been received from a control device, which indicates a failure of a control device. Preferably, in case of redundant control devices a failure is only detected if both control devices have failed or the communication to both control devices is interrupted.

According to the invention, availability of control and data transmission system 10 is increased by the fact that at least one of process devices 300 and 400 has its own runtime system adapted to execute an emergency program, so that it is configured as an intelligent I/O station in this manner.

In response to the detection of a failure, runtime system 320 or 420 of the respective process device 300 or 400 which has detected the failure will accordingly be activated, and a sequence program which has previously been parameterized and which is stored in memory 330 or 430, respectively, will be started as an emergency program.

Using this emergency program, emergency operation of the respective process device is continued based on the last input/output data known. This ensures that this (sub-) process is brought into a defined state or can be continued with limited functionality. In this way, critical system states can be avoided. Moreover, it is possible that these intelligent I/O stations communicate with each other via communication network 500 so as to ensure synchronized emergency operation of the entire system or parts thereof. By equipping selected process devices accordingly, decentralized redundancy islands can be implemented, which allows to increase system availability.

Data exchange between process devices takes place only during emergency operation, and a respective communication link is preferably established only during emergency operation.

For example, during emergency operation sensor signals of a sensor for measuring the filling level of a container may be read by process device 300 and transmitted to process device 400 which in response to the sensor signals controls an inflow into the container by controlling a valve actuated via a connected actuator.

In case of tunnel surveillance, for example, a signaling system may be controlled by a control device in function of the volume of traffic, and available traffic lanes may be selectively assigned to different directions. In such a tunnel surveillance system, during emergency operation, a sensor signal of a smoke detector could be read by process device 300 and transmitted to process device 400 which in response to detecting a formation of smoke controls a signaling system so as to prevent further vehicles from entering the tunnel.

As soon as error-free data telegrams are received again from a control device 100 or 200, this will be detected by the respective evaluation unit 310 or 410, and the system is automatically switched back from emergency operation to the normal transparent mode.

Figure 2:
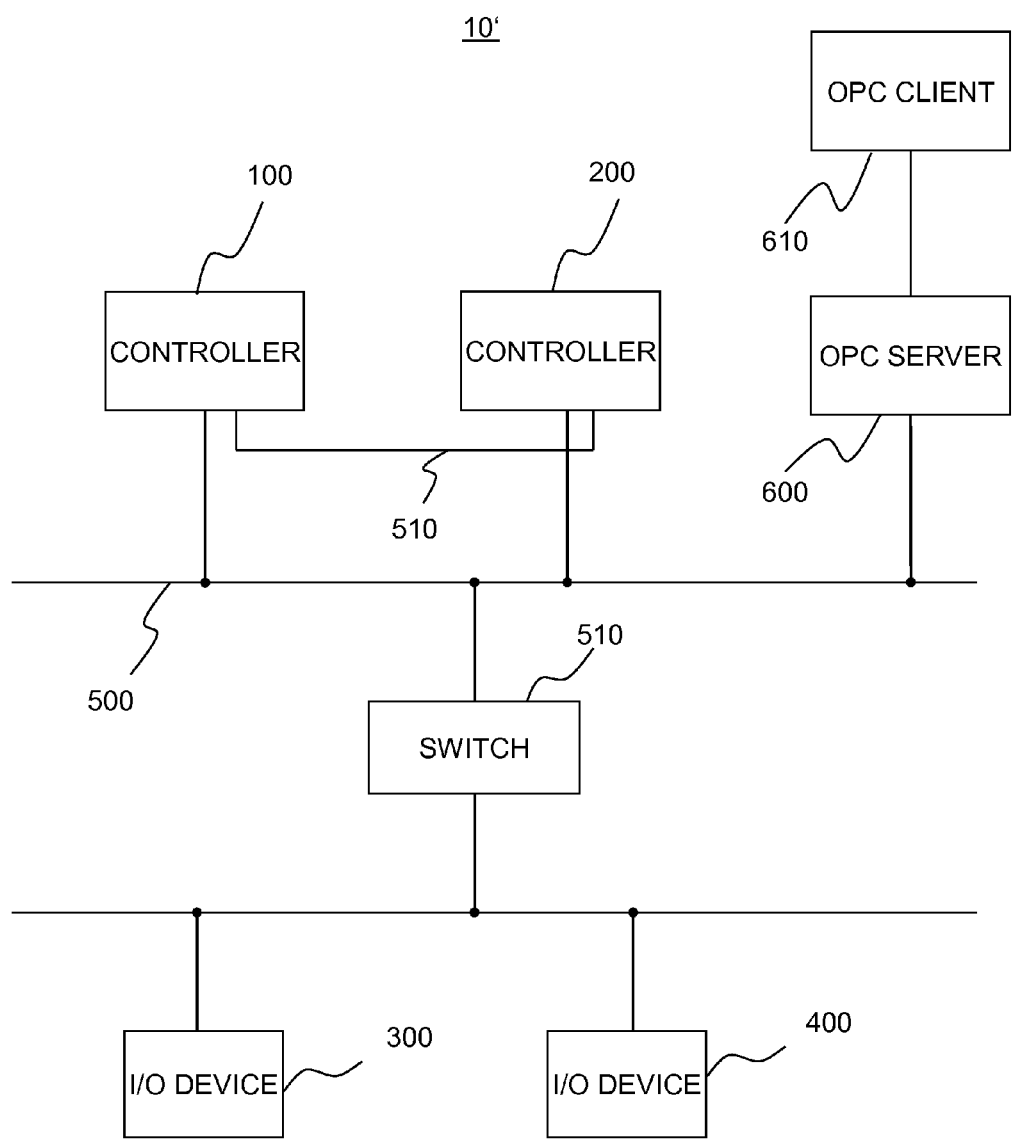
FIG. 2 is a schematic diagram of another preferred embodiment of a control and data transmission system.

FIG. 2 illustrates another exemplary control and data transmission system 10' which in addition to the system 10 shown in FIG. 1 comprises a device for monitoring and operating the process in form of an OPC server 600 which is connected to communication network 500. OPC server 600 is connected, via a suitable connection, to an OPC client arranged in a control room, for example, which permits a user to visualize and operate the process.

OPC server 600 also has direct access to intelligent process devices 300 and 400 via communication network 500. During normal operation, OPC server 600 processes the data of higher level control devices 100 and/or 200. The data of intelligent process devices 300 and 400 are not valid at this time. If the emergency program is started, OPC server 600 receives valid data from intelligent process devices 300 and 400. In this way, the process can continue to be operated and influenced via visualization.

The present invention enables an increase of the availability of a control system, based on the fact that the I/O stations are provided with their own runtime system or that existing I/O stations are replaced by devices having an own runtime system.

A particular advantage of the invention is that the described emergency operation with intelligent I/O stations can even be operated under standard controllers without redundancy function, thus increasing the availability of the system.

The invention claimed is:

1. A control and data transmission system for redundant process control, comprising at least one control device and at least one process device configured as an input and/or output device, wherein the at least one control device, in normal operation, is connected via a communication network to the at least one process device, and wherein the at least one process device comprises:
an evaluation unit adapted to detect a control failure;
an emergency control program which is able to be parameterized and which is stored in a memory of the at least one process device; and
a runtime system adapted to execute the emergency control program; and
wherein the at least one process device is adapted to switch to an emergency operation in response to a control failure detected by the evaluation unit,
wherein, during the emergency operation, the at least one process device executes the emergency control program; and
wherein, during the emergency operation, the at least one process device is adapted to exchange data with at least one further process device via the communication network; and
wherein data received by the at least one process device from the at least one further process device are supplied to the emergency control program as input data, and/or
wherein output data generated by the emergency control program are transmitted from the at least one process device to the at least one further process device, and
wherein the at least one control device comprises at least a first control device and a second control device redundant to the first control device, wherein in normal operation both the first control device and the second control device are connected to the at least one process device, and wherein the at least one process device switches to the emergency operation only when the evaluation unit detects a control failure for both the first control device and the second control device.

2. The control and data transmission system as claimed in claim 1, wherein the evaluation unit of the at least one process device detects a control failure if:
no signal has been received from the at least one control device for a predetermined time period;
an erroneous signal has been received from the at least one control device; and/or
a status signal has been received from the at least one control device, which indicates a failure of the at least one control device.

3. The control and data transmission system as claimed in claim 2 wherein the emergency control program executed by the at least one process device has a different and/or reduced functionality compared to a control program executed by the at least one control device.

4. The control and data transmission system as claimed in claim 2, wherein the emergency control program executed by the at least one process device is adapted to bring the process device and/or at least one further process device into a safe operating state.

5. The control and data transmission system as claimed in claim 2, further comprising an operating and/or monitoring device connected to the communication network, which is adapted to exchange data with the at least one control device during normal operation and with the at least one process device during the emergency operation.

6. The control and data transmission system as claimed in claim 1, wherein, during the emergency operation, the at least one process device is adapted to establish a communication link to the at least one further process device.

7. The control and data transmission system as claimed in claim 6 wherein the emergency control program executed by the at least one process device has a different and/or reduced functionality compared to a control program executed by the at least one control device.

8. The control and data transmission system as claimed in claim 6, wherein the emergency control program executed by the at least one process device is adapted to bring the at least one process device and/or at least one further process device into a safe operating state.

9. The control and data transmission system as claimed in claim 6, further comprising an operating and/or monitoring device connected to the communication network, which is adapted to exchange data with the at least one control device during normal operation and with the at least one process device during the emergency operation.

10. The control and data transmission system as claimed in claim 1, wherein the emergency control program executed by the at least one process device has a different and/or reduced functionality compared to a control program executed by the at least one control device.

11. The control and data transmission system as claimed in claim 7, further comprising an operating and/or monitoring device connected to the communication network, which is adapted to exchange data with the at least one control device during normal operation and with the at least one process device during the emergency operation.

12. The control and data transmission system as claimed in claim 1, wherein the emergency control program executed by the at least one process device is adapted to bring the at least one process device and/or at least one further process device into a safe operating state.

13. The control and data transmission system as claimed in claim 12, further comprising an operating and/or monitoring device connected to the communication network, which is adapted to exchange data with the at least one control device during normal operation and with the at least one process device during the emergency operation.

14. The control and data transmission system as claimed in claim 1, further comprising an operating and/or monitoring device connected to the communication network, which is adapted to exchange data with the at least one control device during normal operation and with the at least one process device during the emergency operation.

15. A process device configured as an input and/or output device, in particular as a field device, being connectable via a communication network to at least one control device and adapted to be controlled by the at least one control device during normal operation, wherein the process device comprises:
an evaluation unit adapted to detect a control failure;
an emergency control program which is able to be parameterized and which is stored in a memory of the process device; and
a runtime system adapted to execute the emergency control program;
wherein the process device is further adapted to switch to an emergency operation in response to a control failure detected by the evaluation unit, wherein, during the emergency operation, the process device executes the emergency control program; and wherein, during the emergency operation, the process device is adapted to exchange data with at least one further process device via the communication network; and wherein data received by the process device from the at least one further process device are supplied to the emergency control program as input data, and/or wherein output data generated by the emergency control program are transmitted from the process device to the at least one further process device, and wherein the at least one control device comprises at least a first control device and a second control device redundant to the first control device, wherein in normal operation both the first control device and the second control device are connected to the process device, and wherein the process device switches to the emergency operation only when the evaluation unit detects a control failure for both the first control device and the second control device.

16. A method for redundant process control, wherein:

in normal operation at least one process device configured as an input and/or output device is controlled by at least one control device that is connected to the at least one process device via a communication network;

a control failure is detected by an evaluation unit of the at least one process device;

the at least one process device switches to an emergency operation in response to a control failure detected by the evaluation unit, wherein, during the emergency operation, the at least one process device executes an emergency control program that is able to be parameterized and is stored in a memory of the at least one process device, using a runtime system;

wherein, during the emergency operation, the at least one process device is adapted to exchange data with at least one further process device via the communication network; and wherein data received by the at least one process device from the at least one further process device are supplied to the emergency control program as input data, and/or wherein output data generated by the emergency control program are transmitted from the at least one process device to the at least one further process device, and wherein the at least one control device comprises at least a first control device and a second control device redundant to the first control device, wherein in normal operation both the first control device and the second control device are connected to the at least one process device, and wherein the at least one process device switches to the emergency operation only when the evaluation unit detects a control failure for both the first control device and the second control device.

* * * * *